Figure 1:
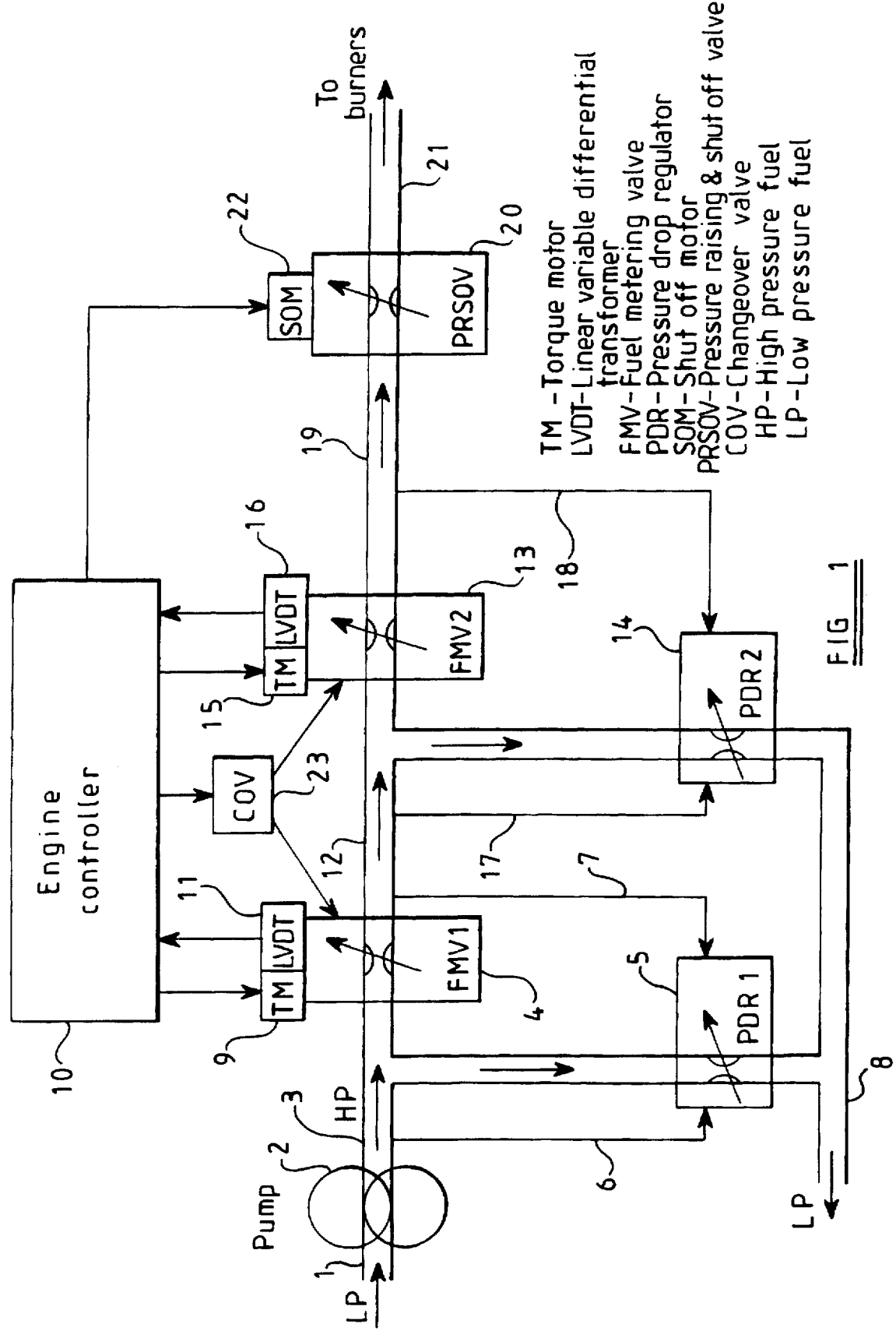

United States Patent [19]

Smith

[11] Patent Number: 5,709,079
[45] Date of Patent: Jan. 20, 1998

[54] DUAL METERING VALVE FUEL CONTROL SYSTEM FOR GAS TURBINE ENGINE

[75] Inventor: Trevor Stanley Smith, Sutton Coldfield, England

[73] Assignee: Lucas Industries, plc, England

[21] Appl. No.: 685,048

[22] Filed: Jul. 23, 1996

[30] Foreign Application Priority Data

Sep. 9, 1995 [GB] United Kingdom .............. 9518582

[51] Int. Cl.$^6$ ........................................ F02C 9/26
[52] U.S. Cl. ........................................ 60/39.281
[58] Field of Search ................ 60/39.281, 243, 60/734

[56] References Cited

U.S. PATENT DOCUMENTS

| | | | |
|---|---|---|---|
| 4,344,281 | 8/1982 | Schuster et al. | 60/39.281 |
| 4,760,662 | 8/1988 | Dyer et al. | 60/39.281 |
| 5,088,278 | 2/1992 | Smith | 60/39.281 |

*Primary Examiner*—Louis J. Casaregola
*Attorney, Agent, or Firm*—Andrus, Sceales, Starke & Sawall

[57] ABSTRACT

A fuel control system for a gas turbine engine comprises a main metering valve and a backup metering valve connected in series. A control circuit supplies demand signals such that, during normal operation, the main metering valve controls fuel flow and the back-up metering valve tracks the main valve but at a position which corresponds to a higher flow.

9 Claims, 2 Drawing Sheets

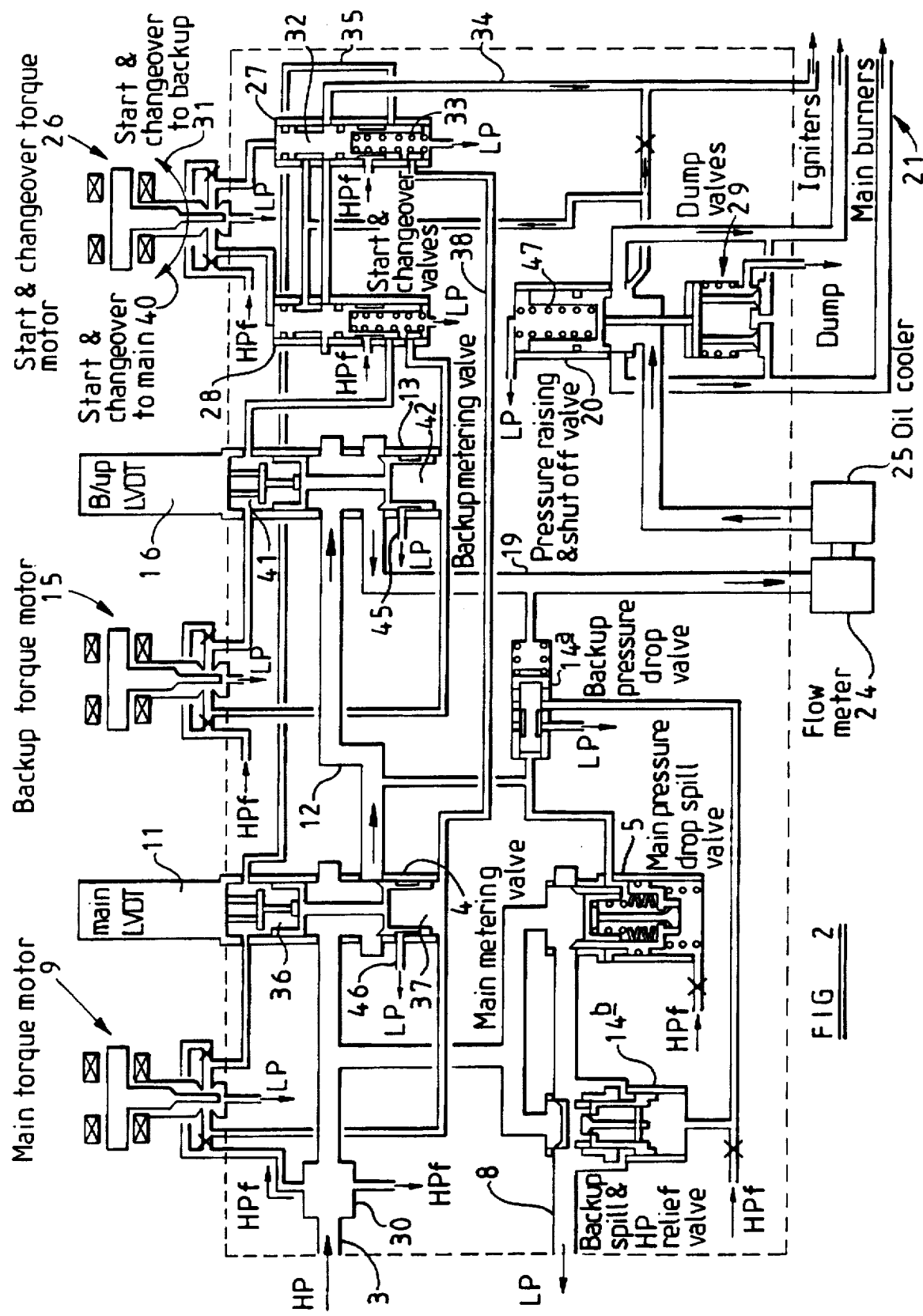

DUAL METERING VALVE FUEL CONTROL SYSTEM FOR GAS TURBINE ENGINE

The present invention relates to a fuel control system for a gas turbine engine. Such a system may be used to control engines, such as jet engines, in aerospace applications, such as in aircraft.

According to the invention, there is provided a fuel control system for a gas turbine engine, comprising a first metering valve for metering fuel flow, a second metering valve for metering fuel flow connected in series with the first metering valve, and a controller arranged, in a first mode of operation, to supply a first fuel demand signal corresponding to a first rate of fuel supply to the first metering valve and to supply a second demand signal corresponding to a second rate of fuel supply higher than the first rate to the second metering valve.

The second metering valve is preferably disposed downstream of the first metering valve.

The second rate is preferably greater than the first rate by a fixed amount or proportion, such as 10%.

There is preferably provided a changeover valve controlled by the controller and arranged, in a second mode of operation, to open fully the first metering valve and, in a third mode of operation, to open fully the second metering valve. The controller is preferably arranged, in the second mode of operation, to supply the first demand signal to the second metering valve.

It is thus possible to provide an arrangement in which a single failure cannot lead to excessive fuel supply and excessive engine speed, which might result in damage to an engine. During normal operation, fuel supply is controlled by the first valve. In the event of a failure such that the second valve attempts to supply a higher rate of fuel flow, the rate continues to be controlled by the first valve. In the event that a fault or failure causes the first valve to attempt to supply a higher fuel rate, the rate of supply is limited to that controlled by the second valve such that a relatively small increase in fuel flow is supplied. The second valve may then be controlled to supply the desired fuel rate.

It is thus possible to dispense with additional emergency/overspeed valves in the system and to dispense with changeover valves from a main fuel line. Because both valves are actively controlled, the possibility of a dormant failure is substantially reduced. Further, because both valves are active, a potentially hazardous upward runaway of fuel flow due to any failure in the controlling elements is automatically limited to a relatively small value by the second metering valve without having to detect the failure of the control element or its effect on the engine and without having to change over to the second metering valve. Thus, control is transferred to the second metering valve very rapidly with no deadband.

The invention will be further described, by way of example, with reference to the accompanying drawings, in which:

FIG. 1 is a block schematic diagram of a fuel control system constituting a first embodiment of the invention for controlling the supply of fuel to an aviation gas turbine engine; and FIG. 2 is a diagram of a fuel control system constituting a second embodiment of the invention.

Like reference numerals refer to like parts in the drawings.

An inlet line 1 supplies low pressure (LP) fuel to a pump 2 which supplies high pressure (HP) fuel to a line 3. The line 3 is connected to the inlet of a first fuel metering valve 4 and to a pressure drop regulator 5. The pressure drop regulator 5 has control lines 6 and 7 connected to the inlet side and the outlet side, respectively, of the first fuel metering valve 4. The pressure drop regulator 5 thus monitors the pressure drop across the valve 4 and, in particular, across a variable area metering orifice within the valve 4 and dumps fuel from the line 3 to a return line 8 so as to maintain a substantially constant pressure drop across the metering orifice.

The valve 4 has a torque motor 9 connected to an engine controller 10 for controlling a valve member which meters fuel flow in the valve 4 by varying the area of the metering orifice. A linear variable differential transformer 11 monitors the position of the valve member and supplies position signals to the controller 10 so that the fuel flow rate is controlled by a closed loop servo-system.

The outlet of the valve 4 is connected via a line 12 to the inlet of a second fuel metering valve 13 and to a second pressure drop regulator 14. The valve 13 is provided with a torque motor 15 and a linear variable differential transformer 16. The pressure drop regulator 14 has control lines 17 and 18 connected to the inlet side and outlet side, respectively, of the second valve 13. The regulator 14 functions in the same way as the regulator 5 to maintain a constant pressure drop across the metering orifice of the valve 13 when the valve 13 is in control. The valve 13, the torque motor 15, and the linear variable differential transformer 16 function in the same way as the corresponding components 4, 9, and 11. However, during normal operation, the controller 10 supplies a demand signal to the second fuel metering valve 13 which is greater, for instance by 10% or 20%, than the signal supplied to the first metering valve 4. During normal operation, the pressure drop regulator 14 closes the connection from the line 12 to the return line 8 and the metering orifice of the valve 13 has no metering effect on fuel flow.

The outlet of the valve 13 is connected via a line 19 to the inlet of a pressure raising and shut-off valve 20, whose outlet is connected via a line 21 to the burners of a gas turbine engine. During normal operation, the valve 20 ensures adequate pump pressure rise so as to spill excess flow from the pump and to ensure that the fuel servos within the system operate correctly. A shut-off motor 22 is controlled by the controller 10 and shuts off the valve 20 so as to prevent the supply of fuel to the engine if and when a situation arises which requires immediate shutdown of the engine.

A change over valve 23 is controlled by the engine controller 10 and controls operation of the fuel metering valves 4 and 13. In particular, the valve 23 has three positions. In a first or middle position, the valve 23 has no effect on the fuel metering valves 4 and 13. This corresponds to normal operation of the fuel system. In the event of a failure or fault affecting the valve 4, any upward increase in flow is limited by the valve 13, which is already in position, so that it assumes control, albeit at a slightly higher flow than the correct value. When the fault is detected, the change over valve 23 is caused by the controller 10 to adopt a second position, in which the valve 4 is driven fully open. The valve 13 then assumes control of metering and the excess fuel flow is limited to no more than 10% because the valve 13 has been tracking the valve 4. The controller 10 rapidly moves the valve 13 to supply the correct demanded fuel flow rate so that a small excess fuel rate is delivered during a brief transient period. In the event of a failure or fault affecting the second fuel metering valve 13, the change over valve 3 is controlled by the controller 10 to adopt a second position, in which the valve 13 is driven fully open. The valve 4 therefore continues to control the supply of fuel to the engine.

It is thus possible to provide a series arrangement of metering valves in a "lowest wins" configuration which prevents upward runaway of fuel flow, and hence of engine speed, automatically in the event of any single failure. Such upward runaway is prevented before the engine controller 10 detects a failure and can take action to isolate the fault. The probability of uncontrolled upward runaway is therefore greatly reduced to the product of the failure rates of at least two failures. It is not necessary to provide an additional emergency/overspeed valve and it is unnecessary to provide a change over valve in the main fuel line to the engine. Correct operation of the change over valve 23, the second metering valve 13, and the second pressure drop regulator 14 may be checked during every flight, for instance at shut down of the engine or prior to commencing a flight. Thus, any dormant failure can be detected. Dormant failures may also be detected during operation of the fuel system, for instance if the valve 13 fails in a fixed open position. In such a circumstance, when the valve 4 demands higher fuel flow rates, the inability to supply such rates through the valve 13 will be detected.

The fuel control system shown in FIG. 2 differs from that shown in FIG. 1 as follows.

The pressure drop regulator 14 is replaced by backup pressure drop valve 14a and a backup spill and high pressure relief valve 14b. A flow meter 24 and an oil cooler 25 are connected in series in the line 19 between the backup metering valve 13 and the pressure raising and shut off valve 20. The changeover valve 23 is replaced by an arrangement comprising a start and changeover torque motor 26 and start and changeover valves 27 and 28. Dump valves 29 are connected to the lines 21 to the main burners of the engine. A fuel filter 30 is provided for supplying high pressure filtered (HPf) fuel from the supply line 3 to various parts of the system.

During normal operation, the start and changeover torque motor 26 is in its central de-energized condition as illustrated in FIG. 2. The start and changeover valves 27 and 28 are in the positions shown and have no effect on the operation of the metering valves 4 and 13. The main metering valve 4 controls the supply of fuel and the main pressure drop spill valve 5 maintains a constant pressure across the metering orifice of the valve 4, as described hereinbefore. The backup metering valve 13 is also controlled so as to be in a demanded position which corresponds to a fuel flow greater than, for instance, 20% of that determined by the main metering valve 4. The pressure drop across the backup metering valve 13 is insufficient to open the backup pressure drop valve 14a so that the backup spill and high pressure relief valve 14b is closed.

In the event of a failure such that the main metering valve 4 is opened excessively, the increase in fuel rate is limited to the value set by the backup metering valve 13. As the main metering valve opening increases, the main pressure drop spill valve 5 closes. When the pressure drop across the backup metering valve 13 increases to the working value, the backup pressure drop valve 14a opens, which in turn opens the backup spill and high pressure relief valve 14b so as to maintain the desired pressure drop across the metering orifice of the valve 13. Upon detection of the failure effecting the main metering valve 4, the engine controller (not shown) controls the backup metering valve 13 so as to supply the desired fuel flow to the engine.

In backup mode, the start and changeover torque motor 26 is operated in the direction indicated by the arrow 31. The pressure supplied to an upper chamber of the valve 27 is increased so that a piston 32 within the valve 27 is urged downwardly against the bias of a spring 33. This causes fuel to be supplied through a line 34 to engine igniters. Further, high pressure filtered fuel is supplied via a line 35 to an upper servo chamber 36 of the main metering valve 4 whereas a lower chamber 37 of the valve 34 is connected via a line 38 to low pressure. This overrides the action of the main torque motor 9 so that the main metering valve 4 is driven fully open. The main pressure drop spill valve 5 closes as described hereinbefore.

In order to select "main only" mode, the start and changeover torque motor 26 is operated in the direction indicated by an arrow 40 so as to operate the start and changeover valve 28. The valve 28 functions in substantially the same way as the valve 27 and supplies fuel to the line 34 for the engine igniters. In addition, the valve 28 connects an upper chamber 41 of the valve 13 to high pressure and a lower chamber 42 to low pressure so that the backup metering valve 13 is driven fully open. Thus, in the event of a fault being detected in the "backup" part of the system, the valve 13 is made inoperative and has no effect on fuel control.

Reversion from the backup or main only modes to normal mode is achieved by de-energising the start and changeover torque motor 26. The motor returns to the position illustrated in FIG. 2, as do the start and changeover valves 27 and 28.

Shut-off of fuel is provided by closing either or both of the metering valve 4 and 13. The pressure downstream of the valve or valves i.e. at the inlet of the pressure raising and shut off valve 20, is connected to low pressure via the port 45 and/or the port 46. The valve 20 is thus closed by an internal spring 47. The dump valves 29 are simultaneously operated to dump fuel from the lines 21 to the main burners.

During and after shut off, the main pressure drop spill valve 5 and/or the backup pressure drop valve 14a and the backup spill and high pressure relief valve 14b opens so as to spill fuel and limit the pressure drop across the metering profile or profiles. Thus, the high pressure pump pressure rise is low during shut down and "wind milling" of the engine.

The metering valves 4 and 13 may be biased to their closed positions, for instance by means of a spring, so that the shut off signal can be removed after shut off and so as to ensure that the valves stay closed during manoeuvre loads.

Starting may be achieved in either the main only mode or in the backup mode by energising the start and changeover torque motor 26 in the appropriate direction. During cranking of the engine and prior to start, the metering valve which is to be used during start is moved to the required position and checked for correct operation whereas the other metering valve is maintained fully closed so that the pressure raising and shut off valve 20 remains closed. The start and changeover torque motor 26 then energised so as to operate the appropriate one of the start and changeover valves 27 and 28. As described hereinbefore, this causes the closed metering valve 4 or 13 to be driven fully open so that the open spill valve 5 or 14b closes and fuel pressure increases so as to operate the pressure raising and shut off valve 20. Flow to the igniters and main burners is then controlled by the one of the valves 4 and 13 which is being used for starting.

I claim:

1. A fuel system for a gas turbine engine, comprising a first metering valve for metering fuel flow, a second metering valve for metering fuel flow connected in series with said first metering valve, and a controller which, in a first mode of operation, supplies a first fuel demand signal corresponding to a first rate of fuel supply to said first metering valve and a second demand signal corresponding to a second rate of fuel supply which tracks the first rate and which is higher than the first rate to said second metering valve.

2. A system as claimed in claim 1, in which said second metering valve is disposed downstream of said first metering valve.

3. A system as claimed in claim 1, in which the second rate is greater than the first rate by a substantially fixed amount.

4. A system as claimed in claim 1, in which the second rate is greater than the first rate by a substantially fixed proportion.

5. A system as claimed in claim 1, further comprising a changeover arrangement controlled by said controller for fully opening said first metering valve in a second mode of operation and for fully opening said second metering valve in a third mode of operation.

6. A system as claimed in claim 5, in which said controller supplies the first demand signal to said second metering valve in the second mode of operation.

7. A system as claimed in claim 5, in which said changeover arrangement comprises first and second changeover valves and a torque motor having a first position for actuating said first changeover valve, a second position for actuating said second changeover valve, and a third position for deactuating said first and second changeover valves.

8. A system as claimed in claim 7, in which said first and second changeover valve fully open said first and second metering valves, respectively, when actuated.

9. A system as claimed in claim 7, in which each of said first and second changeover valves when actuated supplies fuel to an engine ignition system.

* * * * *